United States Patent Office 3,072,677
Patented Jan. 8, 1963

---

3,072,677
SOLID ETHER COMPLEXES OF 2,2'-METHYLENE-BIS(3,4,6-TRICHLOROPHENOL)
Jørgen Christian Christensen Lei, Copenhagen, Denmark, assignor to Rexolin Chemicals AB, Halsingborg, Sweden
No Drawing. Filed June 5, 1961, Ser. No. 114,673
6 Claims. (Cl. 260—340.6)

This invention relates to improvements in or relating to the production of 2,2'-methylene-bis(3,4,6-trichlorophenol). This compound is also known under the designation "hexachlorophene" and for sake of convenience this designation will be used throughout the following specification.

One object of the invention is to provide an improved method of recovering hexachlorophene from a reaction mixture containing same. Another object is to provide a novel solid complex of hexachlorophene with certain ethers this complex being most helpful in the recovery of hexachlorophene from its reaction mixtures. Still another object is to provide a method for producing such complexes from hexachlorophene and certain ethers.

Hexachlorophene which is a well-known bactericidal and bacteriostatic agent and is commonly used in antiseptic soaps, deodorant products, dermatological preparations and the like, is commercially produced by condensing one mole of formaldehyde with two moles of 2,4,5-trichlorophenol in the presence of sulphuric acid or oleum as a catalyst according to the following reaction formula

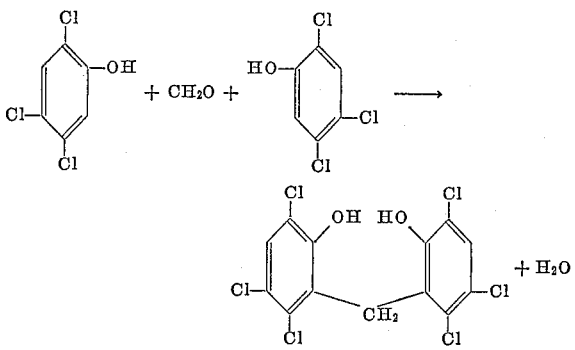

The reaction is aways accompanied by the formation of by-products and it is believed that up to now it has not been possible to obtain a higher yield of hexachlorophene than about 70–75%. The composition of these by-products is not completely known but apart from dark-coloured and polymeric materials xanthones are probably formed. The recovery of the hexachlorophene from the reaction mixture causes considerable difficulties in view of the amount of coloured and colourless impurities which are present in the reaction mixture. Up to now the only suitable method of recovery has been the conversion of the hexachlorophene into the monosodium salt. However, the monosodium salt has to be recrystallized at least once in order to give a pure white hexachlorophene product. Such a crystallization is inconvenient since it requires very large volumes of water.

The present invention relates to an improved method of recovering hexachlorophene from a reaction mixture containing the same and is based upon the surprising discovery that hexachlorophene can form an easy removable solid complex with certain ethers selected from the group consisting of dioxane, acetal, methylal, tetrahydrofuran, diethylene glycol dimethyl ether (bis-β-ethoxyethyl ether) and ethylene glycol dimethyl ether (1,2-dimethoxy-ethane). Of these ethers dioxane is by far the most convenient one in view of its easy availability and in view of the fact that it forms a complex with hexachlorophene in an almost quantitative yield from a tetrachloroethylene solution of the hexachlorophene. Good results are also obtained with acetal and methylal whereas the other compounds mentioned above give somewhat lower yields of the corresponding complexes.

From a practical point of view the most conspicuous property of the dioxane and methylal complexes is that they are obtained in the form of an absolutely white and pure precipitate from the black reaction mixture obtained in the synthesis of hexachlorophene and that upon washing they are obtained in such a pure state that any further purification is unnecessary.

The complex of hexachlorophene obtained with dioxane can be easily removed from the reaction mixture, for instance by filtering or centrifugation or in any other suitable manner. Upon removal from the reaction mixture the solid complex is washed, preferably with the same solvent as that used in the preparation of the hexachlorophene, such as tetrachloroethylene. To obtain the hexachlorophene in a very pure state it is only necessary to dry the complex, for example spread out on trays, at elevated temperatures under an inert atmosphere, for example consisting of nitrogen, or under reduced pressure. It is also possible to isolate the hexachlorophene by spray-drying preferably under reduced pressure or in the presence of an inert atmosphere.

The production of the hexachlorophene reaction mixture is carried out in a manner known per se, for instance according to the British patent specification No. 718,335 [C.A. 49 (1955) 15971].

The invention will be further illustrated by means of the following non-limiting example.

Example

A reaction mixture containing crude hexachlorophene was prepared from 50 g. of 2,4,5-trichlorophenol, 20 g. of oleum (20%) and 75 mls. of tetrachloroethylene as described in Example 6 of the British patent specification No. 718,335 [C.A. 49 (1955) 15971]. Upon completion of the reaction the mixture was heated to 120° C. and separated from the sulphuric acid phase. 0.75 g. of active carbon was added and the mixture was filtered hot to remove traces of sulphuric acid. 11 mls. of dioxane were added and the mixture cooled to room temperature, a dioxane complex of hexachlorophene separating out. The crystals were isolated by filtration and washed colourless with 50 mls. of tetrachloroethylene. Drying of the filter-cake for 3 hours at 110° C. under 2 mms. of mercury gave a good yield of hexachlorophene (M.P. 160–163° C.).

Calc. for $C_{13}H_6Cl_6O_2$ (406.9): C, 38.4; H, 1.5; Cl, 52.3%. Found: C, 38.6; H, 1.5; Cl, 52.0%.

If it is desired to isolate the dioxane complex in a pure state, the filter-cake may be dried at room temperature under 15 mms. of mercury. Such a product (M.P. 140–152° C.), containing 17.8% of dioxane, was analyzed.

Calc. for $C_{17}H_{14}Cl_6O_4$ (495.0): C, 41.3; H, 2.9; Cl, 43.0%. Found: C, 41.2; H, 2.8; Cl, 40.2%.

The tetrachloroethylene may be regenerated from the mother liquor and the wash liquids by distillation. Proper conditions for carrying out such a regeneration are well-known to those skilled in the art.

The dioxane and the tetrachloroethylene may also be removed at atmospheric pressure but the dried product might then become slightly yellowish brown. However, a substantially colourless product may be obtained by drying the complex under nitrogen or carbon dioxide atmosphere.

What I claim is:

1. A solid complex of 2,2'-methylene-bis(3,4,6-trichlorophenol) with an ether selected from the group consisting of dioxane, acetal, methylal, tetrahydrofuran, diethylene glycol dimethyl ether and ethylene glycol dimethyl ether.

2. A solid complex of 2,2'-methylene-bis(3,4,6-trichlorophenol) and dioxane.

3. A solid complex of 2,2'-methylene-bis(3,4,6-trichlorophenol) and methylal.

4. A process of preparing a solid complex of 2,2'-methylene-bis(3,4,6-trichlorophenol), which comprises contacting 2,2'-methylene-bis(3,4,6-trichlorophenol) with an ether selected from the group consisting of dioxane, acetal, methylal, tetrahydrofuran, diethylene glycol dimethyl ether and ethylene glycol dimethyl ether.

5. A process of preparing a solid complex of 2,2'-methylene-bis(3,4,6-trichlorophenol), which comprises reacting 2,2'-methylene-bis(3,4,6-trichlorophenol) with dioxane.

6. A process of preparing a solid complex of 2,2'-methylene-bis-(3,4,6-trichlorophenol), which comprises reacting 2,2'-methylene-bis(3,4,6-trichlorophenol) with methylal.

No references cited.